(12) United States Patent
Meyers et al.

(10) Patent No.: US 10,527,398 B1
(45) Date of Patent: Jan. 7, 2020

(54) TAG ASSEMBLIES

(71) Applicant: Arbre Technologies LLC, Wauwatosa, WI (US)

(72) Inventors: Benjamin Meyers, Watertown, WI (US); Matthieu Vollmer, Stevens Point, WI (US); Michael J. Riebel, Mankato, MN (US); Milton J. Riebel, Mankato, MN (US)

(73) Assignee: Arbre Technologies LLC, Wauwatosa, WI (US)

( * ) Notice: Subject to any disclaimer, the term of this patent is extended or adjusted under 35 U.S.C. 154(b) by 253 days.

(21) Appl. No.: 15/659,883

(22) Filed: Jul. 26, 2017

Related U.S. Application Data

(60) Provisional application No. 62/366,845, filed on Jul. 26, 2016.

(51) Int. Cl.
| | |
|---|---|
| *G01B 5/00* | (2006.01) |
| *G01B 3/10* | (2006.01) |
| *G06Q 50/02* | (2012.01) |
| *G01B 3/00* | (2006.01) |
| *G01B 5/02* | (2006.01) |
| *G06Q 10/06* | (2012.01) |

(52) U.S. Cl.
CPC ......... *G01B 5/0035* (2013.01); *G01B 3/1002* (2013.01); *G06Q 50/02* (2013.01); *G01B 3/008* (2013.01); *G01B 5/025* (2013.01); *G01B 2003/1066* (2013.01); *G01B 2003/1079* (2013.01); *G01B 2210/58* (2013.01); *G06Q 10/06* (2013.01)

(58) Field of Classification Search
CPC ......... G01B 5/0035; G01B 7/18; G01B 7/12; G01B 7/16; G01B 5/025
USPC .......................................... 33/555.4
See application file for complete search history.

(56) References Cited

U.S. PATENT DOCUMENTS

| | | | | |
|---|---|---|---|---|
| 4,483,077 A | * | 11/1984 | Matsumoto | G01B 3/02 116/202 |
| 5,406,715 A | * | 4/1995 | Koizumi | G01B 3/1002 33/512 |
| 5,732,475 A | * | 3/1998 | Sacks | A61B 5/1073 33/512 |
| 6,640,460 B1 | | 11/2003 | Nabarro et al. | |
| 7,146,743 B2 | * | 12/2006 | Oura | A61B 5/107 33/756 |
| 8,701,300 B2 | * | 4/2014 | Kashima | G01B 5/24 33/1 N |
| 9,377,288 B2 | * | 6/2016 | DeLucia | G01B 7/12 |
| 2002/0004992 A1 | * | 1/2002 | Oser | A61B 5/107 33/555.4 |
| 2002/0184779 A1 | * | 12/2002 | Bohnengel | G01B 3/1056 33/555.4 |

(Continued)

*Primary Examiner* — Yaritza Guadalupe-McCall
(74) *Attorney, Agent, or Firm* — Andrus Intellectual Property Law, LLP

(57) ABSTRACT

A tag assembly for measuring a characteristic of a tree includes a band and a shield strip. The band is configured to encircle the tree and has a plurality of tags spaced apart along the band. The shield strip extends along the band to thereby shield a number of tags in the plurality of tags such that the plurality of tags includes shielded tags and unshielded tags. The shield strip prevents the shielded tags from being read or emitting signals and while the unshielded tags can be read or emit signals such that the characteristic of the tree can be determined.

3 Claims, 11 Drawing Sheets

(56) References Cited

U.S. PATENT DOCUMENTS

| | | | |
|---|---|---|---|
| 2007/0185749 A1 | 8/2007 | Anderson et al. | |
| 2012/0266479 A1* | 10/2012 | Park | G01B 5/0035 33/712 |
| 2014/0360037 A1* | 12/2014 | DeLucia | G01B 7/12 33/555.4 |
| 2015/0116092 A1* | 4/2015 | Yang | G01B 5/025 340/10.4 |

* cited by examiner

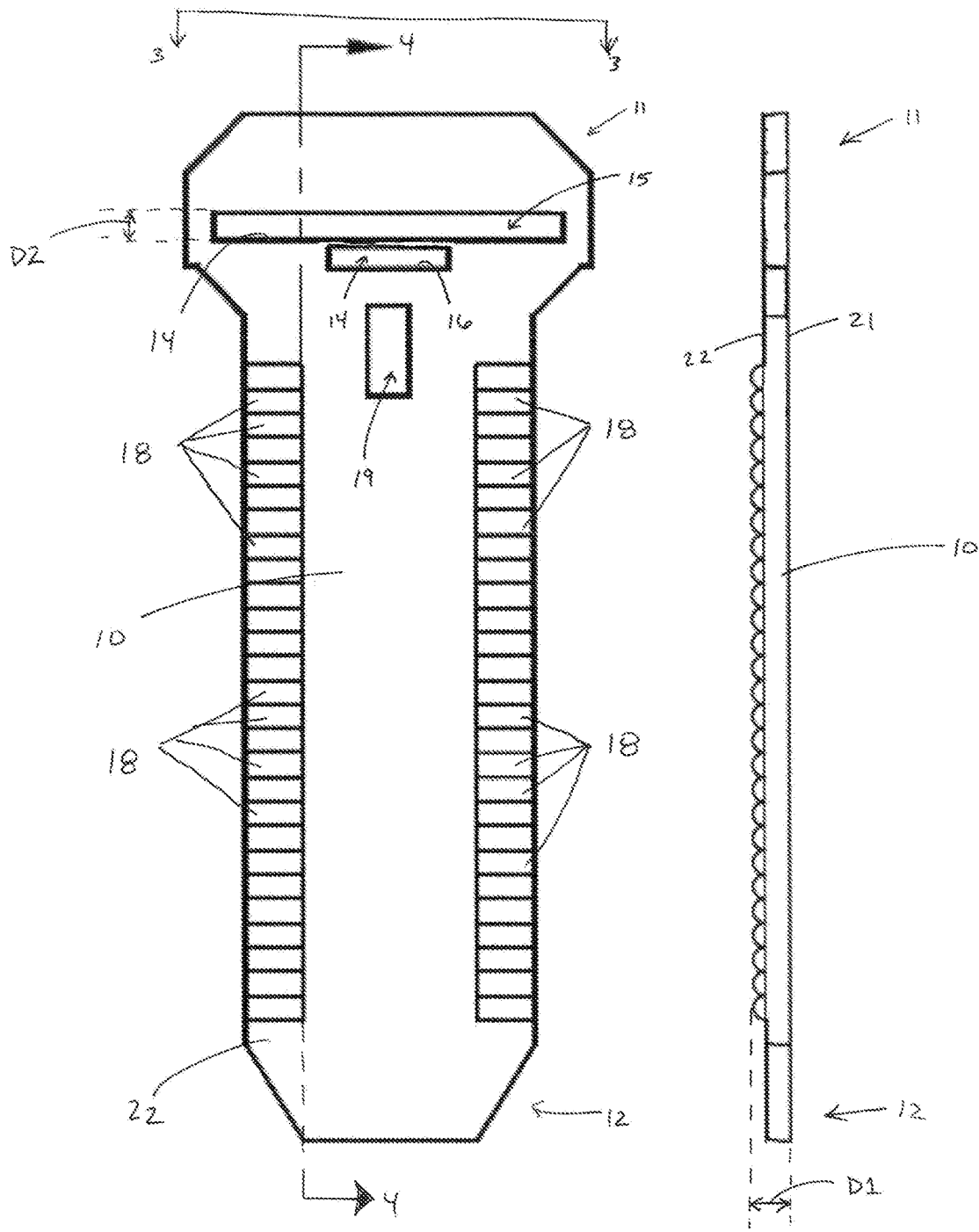

TAG ASSEMBLIES

CROSS-REFERENCE TO RELATED APPLICATION

The present application is based on and claims priority to U.S. Provisional Patent Application No. 62/366,845 filed Jul. 26, 2016, the disclosure of which is incorporated herein by reference.

FIELD

The present disclosure relates to tag assemblies for measuring characteristics of objects, specifically tag assemblies for measuring circumferences and/or diameters of plants (e.g. trees trunks, tree branches) and animal parts (e.g. legs of turkeys).

BACKGROUND

The following U.S. Patent Application Publication and U.S. Patents are incorporated herein by reference in entirety.

U.S. Patent Application Publication No. 2015/0116092 discloses a wireless communication tag apparatus including a girth measurement device and a wireless communication tag method. The wireless communication tag apparatus and method measures a girth of a tree using an unwound length of a tape wound around a trunk of the tree according to growth of the tree, and transmits the girth to a wireless communication reader.

U.S. Pat. No. 6,640,460 discloses a measuring tape for measuring the torso girth of a user. The tape includes a separable fastening that, when fastened, creates a loop of tape that extends in use around the user's torso without support from the user's hands, a link co-operable with the tape allowing the circumference of the loop to be adjusted or varied when around the user's torso, and girth indicia co-operable with the link to indicate the circumference of the loop.

U.S. Pat. No. 9,377,288 discloses a dendrometer comprises a dendrometer band whose length is extendable for encircling a tree trunk. The dendrometer further comprises an elongated electronic component that is closely or contiguously attached to the dendrometer band for moving along with the dendrometer band in order to follow length extension of the dendrometer band. Length variation of the dendrometer band is configured to be converted to electronic signals by the electronic component.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a tag assembly for a tree having a measurable characteristic includes a band and a shield strip. The band is configured to encircle the tree and has a plurality of tags spaced apart along the band. The shield strip extends along the band to thereby shield a number of tags in the plurality of tags such that the plurality of tags includes shielded tags and unshielded tags. The shield strip prevents the shielded tags from being read or emitting signals while the unshielded tags can be read or emit signals such that the characteristic of the tree can be determined.

In certain examples, a tag assembly for a tree having a diameter includes a band and a shield strip. The band is configured to encircle the tree and has a plurality of tags spaced apart along the band. The band has a first end and an opposing, second end that cooperates with the first end to encircle the tree such that the band has a loop section that encircles the tree and a growth section. The loop section has a loop radius and the growth section has a growth length, and the loop radius and the growth length change as the diameter of the tree changes. The shield strip extends along one of the loop section and the growth section to thereby shield a number of tags in the plurality of tags such that the plurality of tags includes shielded tags and unshielded tags. The shield strip prevents the shielded tags along one of the loop section and the growth section from being read or emitting signals and while the unshielded tags along the other of the loop section and the growth section are capable of being read or emit signals such that the diameter of the tree can be determined.

In certain examples, a system for measuring a characteristic of a tree includes a band configured to encircle the tree that has a plurality of tags spaced apart along the band; a shield strip extending along the band to thereby shield a number of tags in the plurality of tags such that the plurality of tags includes shielded tags and unshielded tags; a sensor configured to sense or read the unshielded tags; and an indicator configured to indicate the characteristic of the tree based on the unshielded tags sensed by the sensor.

In certain examples, a method of determining a characteristic of a tree includes encircling a tree with a band having a plurality of tags spaced apart along the band, the band configured to adapt to the tree and expand as the tree grows; positioning a shield strip along the band to thereby shield a number of tags in the plurality of tags from being read or emitting a signal, wherein the plurality of tags includes at least one shielded tag and at least one unshielded tags and wherein the number of shielded tags and unshielded tags changes as the tree grows; sensing or reading, with a sensor, the unshielded tags; determining, with a controller, the characteristic of the tree based on the unshielded tags sensed by the sensor; controlling, with the controller, an indicator to thereby indicate the characteristic of the tree.

In certain examples, a tag assembly for a tree having a characteristic includes a band and a shield strip. The band is configured to encircle the tree and has a tag coupled to the band. The shield strip extends along the band to thereby shield the tag from being read or emitting a signal. The band is configured to expand as the tree grows such that the tag is moved relative to shield strip and becomes unshielded. The unshielded tag can be read or emit a signal when unshielded such that the characteristic of the tree can be determined.

In certain examples, a tag assembly is for measuring a characteristic of an object. The tag assembly includes a band and a shield strip. The band is configured to encircle the object and has a plurality of tags spaced apart along the band. The shield strip extending partially along the band to thereby shield a number of tags in the plurality of tags such that the plurality of tags includes shielded tags and unshielded tags. The shield strip prevents the shielded tags from being read or emitting signals, and the unshielded tags can be read or emit signals such that the characteristic of the object can be determined.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 2 is a front view of the tag assembly of FIG. 1.

FIG. 3 is a top view of the tag assembly of FIG. 1 along line 3-3 on FIG. 2.

FIG. 4 is a cross sectional view of the tag assembly of FIG. 1 along line 4-4 on FIG. 2.

DETAILED DESCRIPTION

Figure 1:
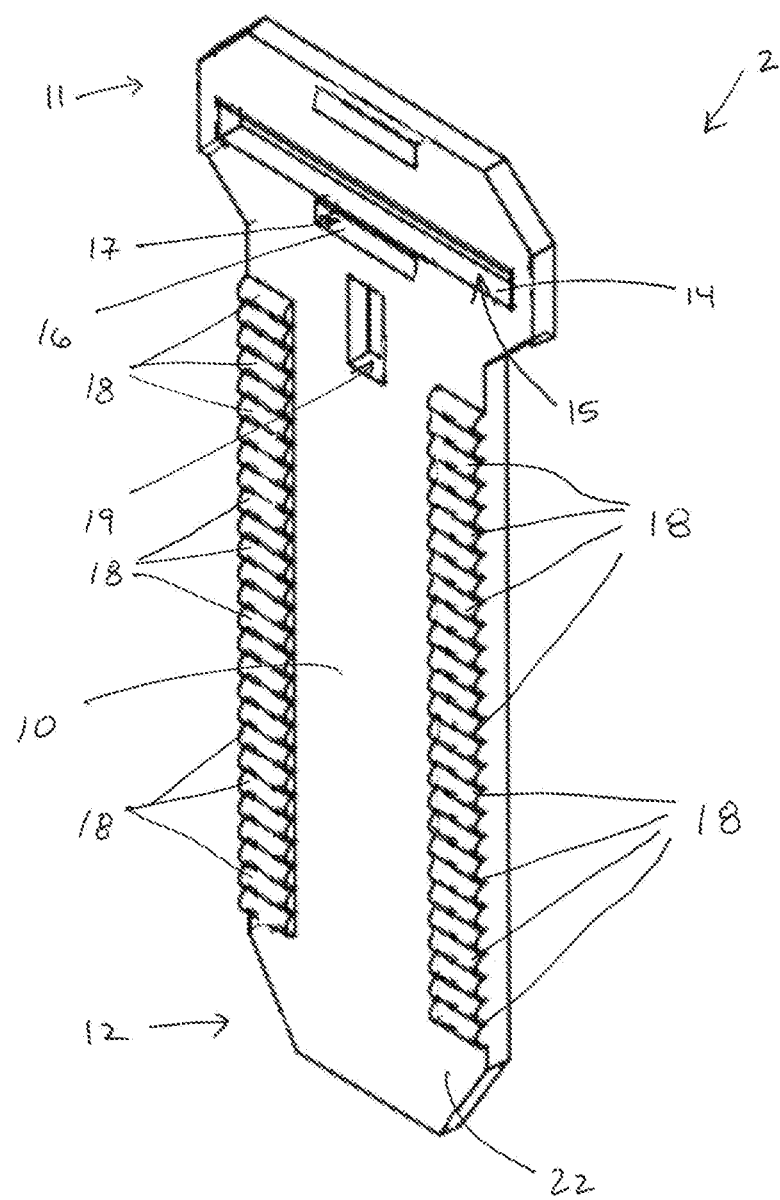
FIG. 1 a front perspective view of an example tag assembly.

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

The present inventors have recognized that in certain industries, such as forestry, tree nursery, farming, livestock, etc., accurate and efficient measurements of materials used are necessary and important to maximizing value, minimizing waste, and increasing manufacturing efficiencies and productivities.

For example, in the tree nursery industry understanding and monitoring tree growth is very important and it is highly desired to measure and/or determine characteristics of trees, e.g. trunk circumference, diameter, size, location, quality. These characteristics allow the nursery operator to sell trees once the trees reach an optimum size and to know the inventory of trees by size. In another example, forestry groups or forestry management industries often monitor trees in a plot of land in order to know when the trees have reached an optimum size/age and are ready to be harvested. In still another example, entities engaged in arboriculture often conduct scientific research on mature trees, i.e. measure the diameter of trunks, branches, and limbs, and calculate diameter at breast height (dbh). Furthermore, knowing characteristics of the trees can be important for environmental requirements, surveys, and/or practices, and monitoring of trees has become especially important in recent years as issues related to climate change have evolved, e.g. monitoring how certain species of trees grow as climates change, in order to understand how best to manage forests and replanting practices.

The measurement of the various tree characteristics by tree nurseries and forestry groups is often accomplished by manual, time-consuming procedures that require substantial human labor to complete. For example, workers may walk from tree to tree so that they can measure the trees by hand. In many cases, these time-consuming procedures were simply not completed, incorrectly completed, or simply not done.

In certain examples, tree nurseries aim to grow trees from small "whips" to trees having reasonable size for sale and transplanting. These trees are priced and sold by both species and/or caliper (i.e. diameter) of the tree trunk. Nurseries often require diameter measurements of ¼ of an inch or less increments. For forestry groups, tree diameter and size are important for both quality and quantity of lumber harvested from the plot for land. In both applications, accurate measurements and data regarding the characteristics of the trees are essential. Inaccurate measurements can create problems with both tree/lumber inventory and the cost at which the nurseries and forestry groups sell the tree or lumber.

The present inventors have also recognized that significant progress has been made over the past few decades by various industries in the way food is traced from the farm to the table. For instance, since the early 1990's mechanically harvested crops, such as corn, wheat, and beans, can be traced at harvest using yield monitors with global positioning system (GPS) receivers. Furthermore, bar codes and radio frequency identification (RFID) tags and readers facilitate the tracking of fruits and vegetables after arriving in bins at processing plants. An example of this progress is disclosed in U.S. Patent Application Publication No. 2007/0185749 which teaches a method for tracking hand harvested orchard crops comprising a wireless communication device that links together specific trees to a produce bin.

In fact, some trees are currently managed using an electronic communication device, such as a RFID tag, which allows the nursery operator to correlate specific data, e.g. location, species, age, to the tree the RFID tag is attached to. However, conventional RFID tags do not efficiently and effectively measure and provide information on the changing diameter or caliper of the tree. Therefore, the caliper according to growth of the tree needs to be separately measured by a person. One attempt at making a wireless tree caliper measurement device is disclosed in U.S. Pat. No. 9,377,288 that teaches of a dendrometer band for trees that includes a potentiometer and various electronic components that can be connected to a data logger. However, this system, or systems like it, requires power, e.g. a battery or solar cell, in order to operate. Furthermore, these systems are expensive due to the numerous required components, i.e. potentiometer, transmission electronics, and power sources. Another practical problem of these types of systems is that many nurseries or forestry groups do not wish to change batteries at each tree as the systems are used over many years. It is often uneconomical for nurseries or forestry groups to expend monetary and labor resources for these systems on numerous, i.e. tens, hundreds, thousands, millions, of trees.

Another prior art system is disclosed in U.S. Patent Application Publication No. 2015/0116092 which teaches of a wireless communication device that includes girth measurement device. The girth or caliper measurement device includes a multiple wound tape and a measurement system that measures the amount of tape unwound as the tree grows. The device then transmits the tree characteristic information, i.e. data, through a powered transmission system.

Accordingly, the present inventors have endeavored to develop an improved system for determining the characteristics, e.g. diameter, circumference, of a tree. The improved systems, apparatuses, and methods described herein aim to reduce the cost and time necessary to collect information regarding the trees, track tree growth, maintain an accurate inventory of trees, maintain the location of the trees, and increase the revenue generated by the sale of trees/lumber. Aspects of the present disclosure can be utilized by tree nurseries and forestry groups for any size tree, and the present disclosure minimizes costs associated conventional prior art tree measurement systems, e.g. battery power at the tree not necessary, remote accurate collection of measurement data.

The present inventors have also recognized that aspects of the present disclosure may be applicable to other industries in which measuring and tracking growth are important, e.g. livestock industry, produce (vegetable/fruit) industry. Accordingly, the references to the tree nursery/forestry industries herein, and associated terminology, are merely a non-limiting application of the aspects of the present disclosure described herein. As such, aspects of the present disclosure can be applied to other industries or applications to thereby determine various characteristics of objects. Furthermore, aspects of the present disclosure can be utilized when determining the metric tons of trees harvested when the harvested trees are weighed and to measure root growth or below-ground growth.

Figure 5:
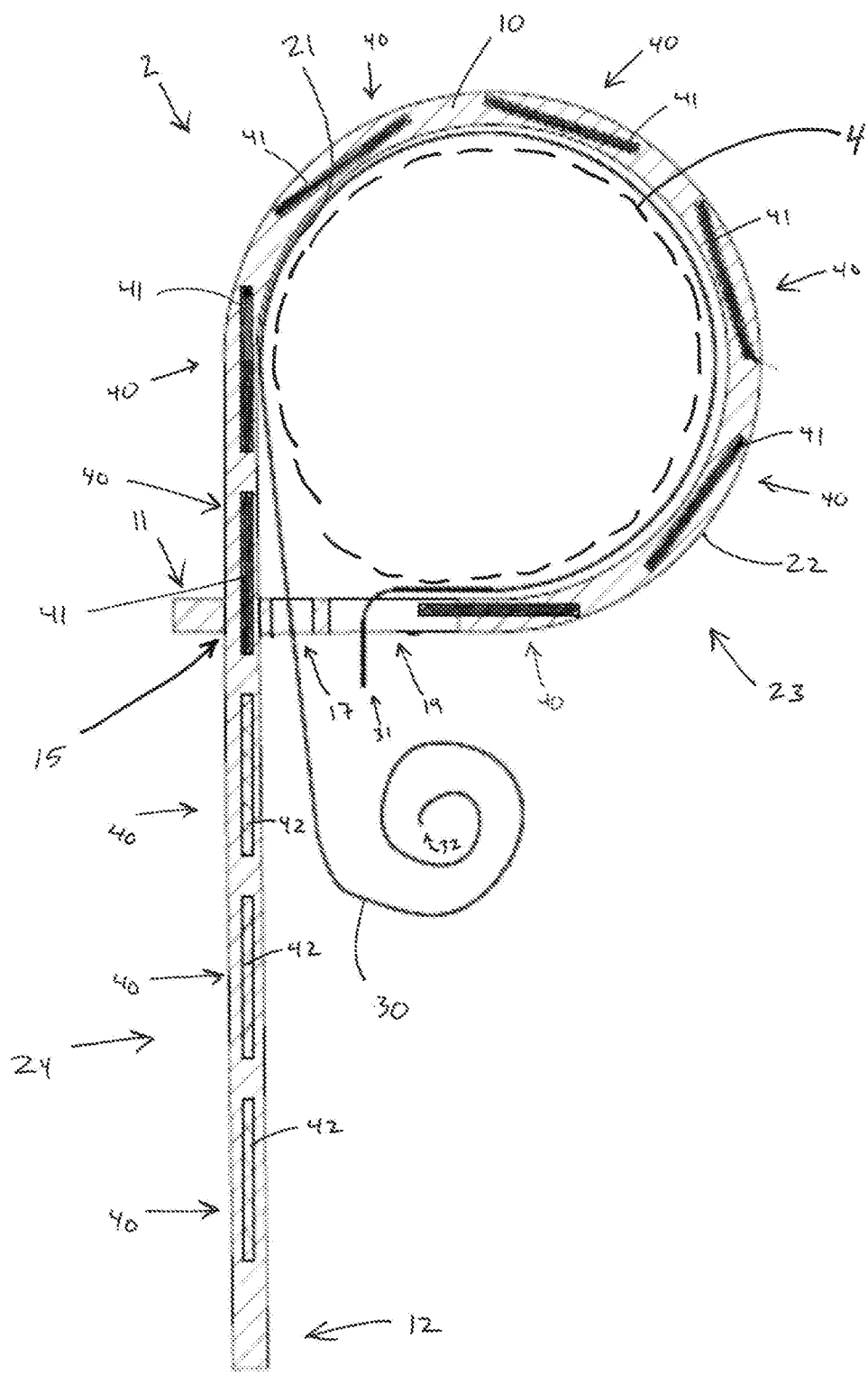
FIG. 5 is a cross sectional view of an example tag assembly of FIG. 12 along line 5-5 on FIG. 12.

Referring to FIGS. 1-4, an example tag assembly 2 is depicted. The tag assembly 2 includes a band 10 that is configured to encircle or wrap around a tree 4 (FIG. 5). The band 10 has a head or first end 11 and an opposite, tail or second end 12. The band 10 is elongated between the first and second end 11, 12 and has at least one tag 40 (see FIG. 5, further described herein) spaced there between.

The second end 12 is configured to cooperate with the first end 11 when the band 10 encircles the tree 4. The band 10 has a band opening edge 14 that defines a band opening 15 through which the second end 12 is received when the band 10 encircles the tree 4 (FIG. 5). In some examples, the band 10 also includes a strip edge 16 that defines a strip opening 17 through which a shield strip 30 (described herein) is received when the band 10 encircles the tree 4. In certain examples, the edges 14, 16 and/or the openings 15, 17 may be integral with one another, respectively, i.e. an edge of the band 10 may define an opening that receives both the second end 12 of the band 10 and the shield strip 30. The band 10 has an inner or first surface 21 that is positioned nearer the tree 4 than an opposite, outer or second surface 22 when the band 10 encircles the tree 4.

The band 10 includes at least one projection tooth 18 or a series of projections of teeth 18 positioned between the first and second ends 11, 12. The teeth 18 are configured to engage the band opening edge 14 when the second end 12 is received through the band opening 14. The teeth 18 prevent the band 10 from slipping or sliding out of the band opening 14. The teeth 18 are coupled to and project from either surface 21, 22 of the band 10. The combined thickness of the band 10 and teeth 18 (see D1) is greater than the height of the band opening 15 (see D2). The band 10 and/or the teeth 18 are made of elastic materials that allow for elastic deformation of one or both of the band opening edge 14 and the teeth 18 such that the second end 12 can be received through and/or retained in the band opening 15. As described further therein, as the tree 4 grows the teeth 18 and the band opening edge 14 elastically interact with each other such that the band 10 incrementally expands with the tree 4. That is, the teeth 18 incrementally move relative to the band opening 15 as the tree 4 grows such that the band 10 remains on the tree 4 and does not inhibit growth. Any number of teeth, openings, and/or edges can be included with the band 10. The thickness of the band 10 can vary, e.g. the thickness of the band 10 may be thin so that band 10 can be easily wrapped around trees 4 with small radii.

The band 10 and/or teeth 18 can be made from any suitable material such as rubber, metal, and plastic. The band 10 and teeth 18 can be integrally formed together. In certain examples, the band 10 is made of materials that are ultraviolet (UV) resistant and/or water resistant. In other examples, the band 10 and teeth 18 are made of dissimilar materials and the teeth 18 are fastened, e.g. adhesives, mechanical fasteners, to the band 10. The position of the tag(s) 40 relative to the band 10 can vary. For example, the tag(s) 40 can be adhered to the second surface 22 of the band 10; embedded into the band 10; and/or fully enveloped by the band 10. In one non-limiting example, the band 10 comprises a material layers that sandwich or fully envelop the tag(s) 40. The band 10 can be formed by any suitable forming method including injection molding. The band 10 can include ribs (not shown) on one the surfaces 21, 22 to allow for air flow between the band 10 and the tree 4 to prevent mold growth or moisture related considerations.

The tag(s) 40 included with the band 10 can be any type of device or indicia that that can be read or emit a signal. For example, the tag(s) 40 can be barcodes, colored regions, printed indicia, RFID tags, transponders, transceivers, emitters, light emitting diodes, electromagnetic emitters, Automatic Identification and Data Capture (AIDC) devices, and the like. With regarding to AIDC devices, AIDC devices and methods automatically identify objects, collect data about them, and enter data directly into computer systems with little or no human intervention. The tag(s) 40 interact with sensors, readers, and the like such that the signals or data is transferred between the tag(s) 40 and the controller 100. In a specific non-limiting example, suitable RFID tags are commercially available from Impinj Monza R6P.

In a non-limiting preferred embodiment, the tag(s) 40 are RFID tags comprising an integrated circuit and an antenna that is configured to communicate with a sensor, reader, and/or interrogator. In operation, when radio frequency (RF) radiation is directed at the RFID tags, the RFID tags respond by emitting a response signal corresponding to the data on the RFID tag. The response signal can include data or information that allows the RFID tag to be identified. Power is not required by the RFID to emit the signal as these RFID tags are passive RFID tags. However, in certain examples, the RFID tags are connected to a power source, e.g. battery, solar panel, such that the RFID tags emit signals to the reader, i.e. a RFID tag with a battery is an active RFID tag. The active RFID tag can be a transponder or a beacon. The type of RFID tags can vary, e.g. square RFID tags, linear RFID tags, narrow width RFID tags, laminated RFID tags, paper or plastic film mounted RFID tags, and the radio frequency in which the RFID is operable can vary, e.g. standard practice frequencies, UHF frequencies. The passive RFID tags can be inlays or hard tags. In certain examples, the RFID tags can be designed to account for the substrate, e.g. metal, on which the RFID tags are attached. In certain examples, a single antenna may be used for multiple RFID tags.

As briefly described above, any number of tag(s) can be included with and spaced apart along the tag assembly 2. In one non-limited example, the tag(s) 40 are spaced apart at intervals such that as the tree grows, incremental measurements of ¼ of an inch are determined by the controller 100. A person having ordinary skill in the art will recognize that the spacing between the tag(s) 40 can be adjusted according to the specific application of the tag assembly 2 to thereby adjust the accuracy and precision of the measurements determined by the controller 100.

Referring to FIG. 5, a shield strip 30 is included with the tag assembly 2 and extends partially along the band 10 to thereby shield a number of tag(s) 40 from being read and/or emitting signals. That is, the shield strip 30 is configured to prevent certain tag(s) 40, i.e. shielded tag(s) 41, that are in close proximity to the shield strip 30, from being read or emitting a signal (see shielded tags 41 on FIG. 5). Other tag(s) 40, namely unshielded tag(s) 42, are not shielded by the shield strip 30 and therefore can read or emit signals. For example, when the tag(s) 40 are passive RFID tag(s) the unshielded tag(s) 42 transmit data when a reader's electromagnetic "waves" hit the unshielded tag(s) 42 to thereby "power on" the unshielded tag(s) 42. However, the shield strip 30 prevents the other shielded tag(s) 41 from being hit with the electromagnetic "waves" and/or transmitting a return signal due to the material characteristics of the metal that inherently blocks the electromagnetic "waves", i.e. the electromagnetic "waves" cannot penetrate through the shield strip and therefore the shielded tag(s) 41 do not transmit a signal or cannot be read by the reader. The shield strip 30 can be made of any suitable material, e.g. metal, metal foils, metalized plastics, metal coatings, shielding adhesives, metal coil, that when in close proximity to the tag(s) 40 prevents the shielded tag(s) 41 from being read or emitting a signal. The shield strip 30 can be embedded in the band 10, integral to the band 10, positioned along the first surface 21 of the band 10, and/or positioned along the second surface 22 of the band 10. In the example depicted in FIG. 5, the shield strip 30 is positioned along the first surface 21 between the tree 4 and the band 10. The length of the shield strip 30 can vary and the shield strip 30 can include a reserve length that is utilized as the tree 4 grows.

Figure 17:
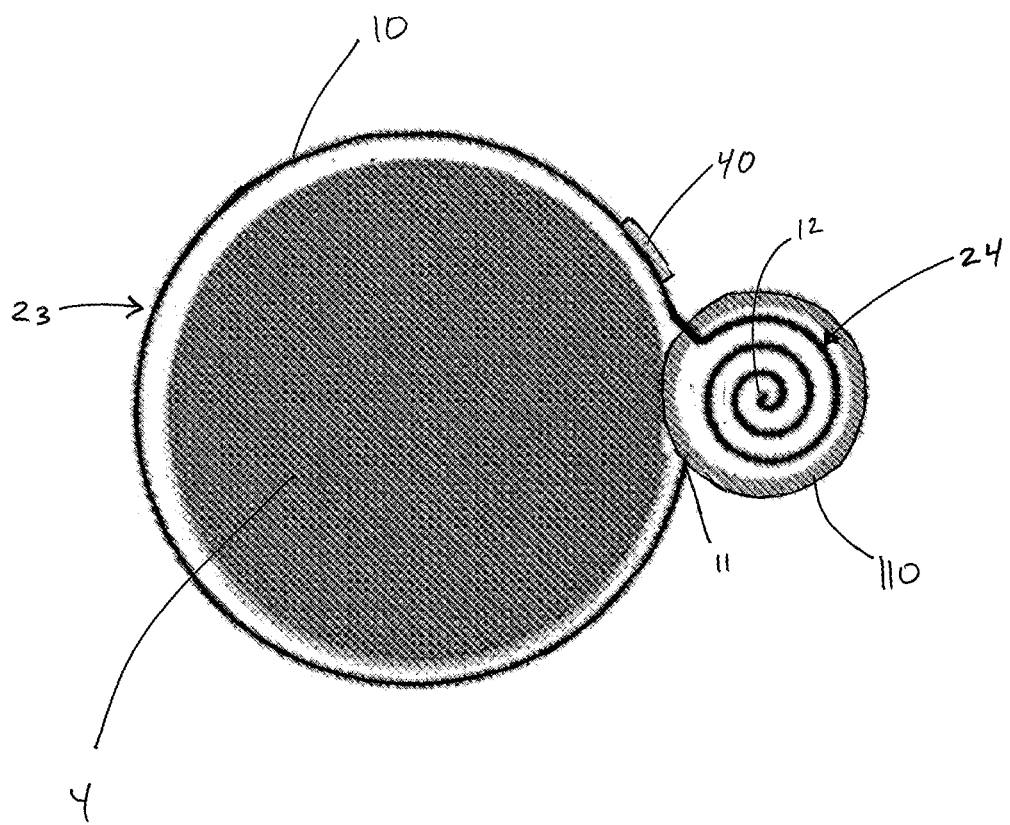
FIG. 17 is a cross sectional view of another example tag assembly on a tree.

The shield strip 30 has a first end 31 that is coupled to or near the first end 11 of the band 10. In the example depicted in FIG. 5, the first end 31 extends through an opening 19 in the band 10 and an opposite, second end 32 extends through the strip opening 17. The second end 32 is positioned relative to the band 10 such that the unshielded tag(s) 42 are capable of being read or emitting signals. In operation, as will be described further herein, the shield strip 30 moves relative to band 10 as the band 10 expands and the tree 4 grows to either shield and uncover, i.e. "un-shield", certain tag(s) 40. The shield strip 30 can include a color coded mark to define the end of the shield strip 30. A person having ordinary skill in the art will recognize that the number and position on the shielded tag(s) 41 and the unshielded tag(s) 42 will vary based on the position of the shield strip 30 and the size/shape of the band 10 relative to the tree 4. The tag(s) 40 can be shielded or unshielded based on the position of the shield strip 30 relative to the physical planes, e.g. longitudinal plane, transverse plane, of the tag(s) 40. Furthermore, the distance between the tag(s) 40 and the shield strip 30 can result in the tag(s) 40 being shielded or unshielded. The distance between the tag(s) 40 and the shield strip 30 when the tag(s) 40 is a shield tag(s) 41 can vary (e.g. 1.0 millimeter, 5.0 millimeters, 20 millimeters, 1.0 centimeters, 2.0 centimeters, 5.0 centimeters, 0.10 inches, 0.25 inches, 0.50 inches, 1.0 inches, 2.0 inches) and will depend on the type of tag(s) 40 utilized, the material of the shield strip 30, and the reader or sensor used. In certain examples, the band 10 can include a separator (not shown) that is configured to create a minimum distance between a number of tag(s) 40 and the shield strip 30 such that the section of the shield strip 30, e.g. a reserve section, does not inadvertently shield certain tag(s) 40. The prevent inventors have also recognized that in certain examples, a shielded sleeve 27 can be used to shield tag(s) 40 along the growth section 24. In this example, as the tree 4 grows, the tag(s) 40 would be moved out of the shielded sleeve 27 such that the unshielded tag(s) 42 can be read or emit a signal. That is, the growth section 24 would incrementally "slip" out of the shielded sleeve 27 thereby exposing the tag(s) 40, i.e. unshielded tag(s) 42. In other examples, the band 10 with the tag(s) 40 thereon is coiled within a shielded housing that is attached to the tree 4 (see FIG. 17). To attach the housing to the tree 4, a portion of the band 10 is pulled out of the housing 110 and wrapped around the tree 4 such that the first end 11 of the band 10 is coupled to the housing 110. As the tree 4 grows the band 10 and subsequent tag(s) 40 on the band 10 are moved (e.g. pulled) out of the housing 110 such that the unshielded tag(s) 40 can be read or emit a signal.

An example installation procedure of the tag assembly 2 onto a tree 4 is depicted in FIGS. 6-13 and described in detail below.

Figure 6:
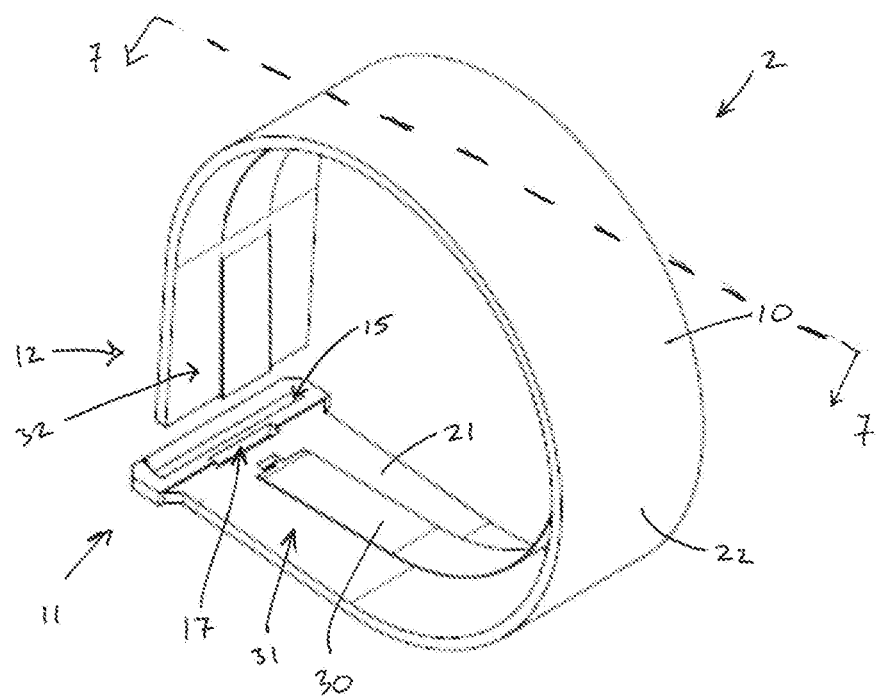
FIG. 6 is a perspective view of an example tag assembly.
Figure 7:
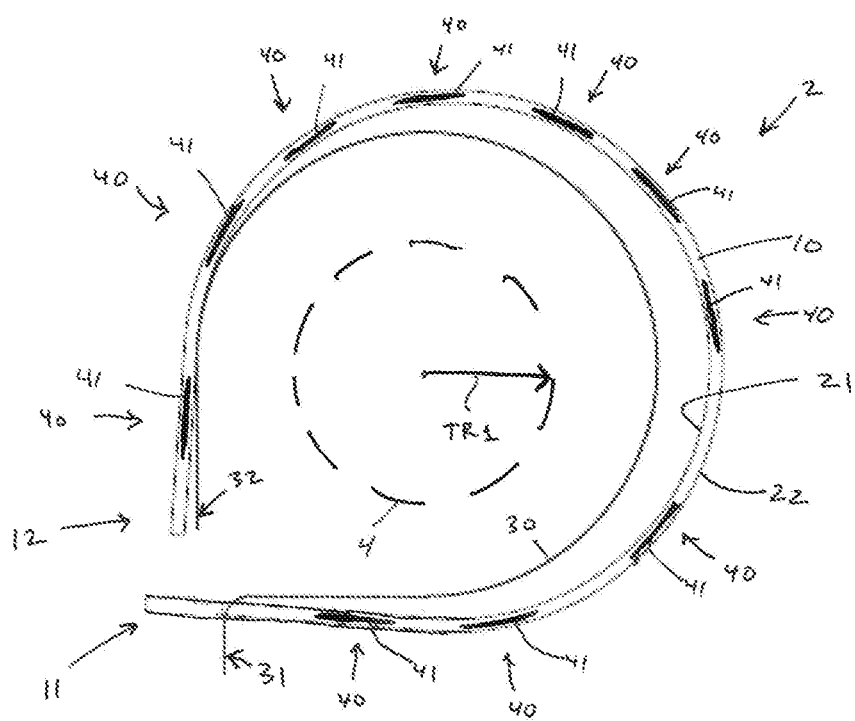
FIG. 7 is a cross sectional view of the tag assembly of FIG. 6 along 7-7 on FIG. 6 with the example tag assembly positioned relative to a tree (dashed lines) having a first tree radius.

FIGS. 6-7 depict the tag assembly 2 maneuvered around part of a tree 4, i.e. a tree trunk or branch, that has a first tree radius TR1.

Figure 8:
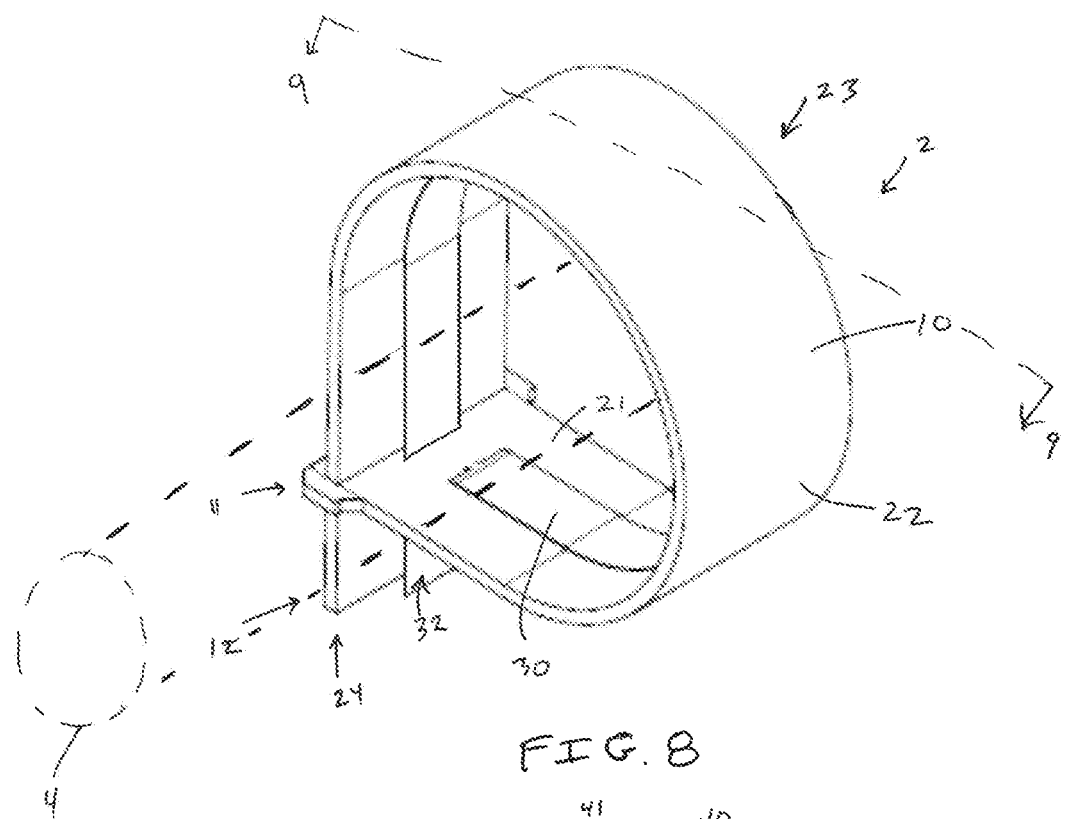
FIG. 8 is a perspective view of the tag assembly of FIG. 6 with the tag assembly encircling the tree.
Figure 9:
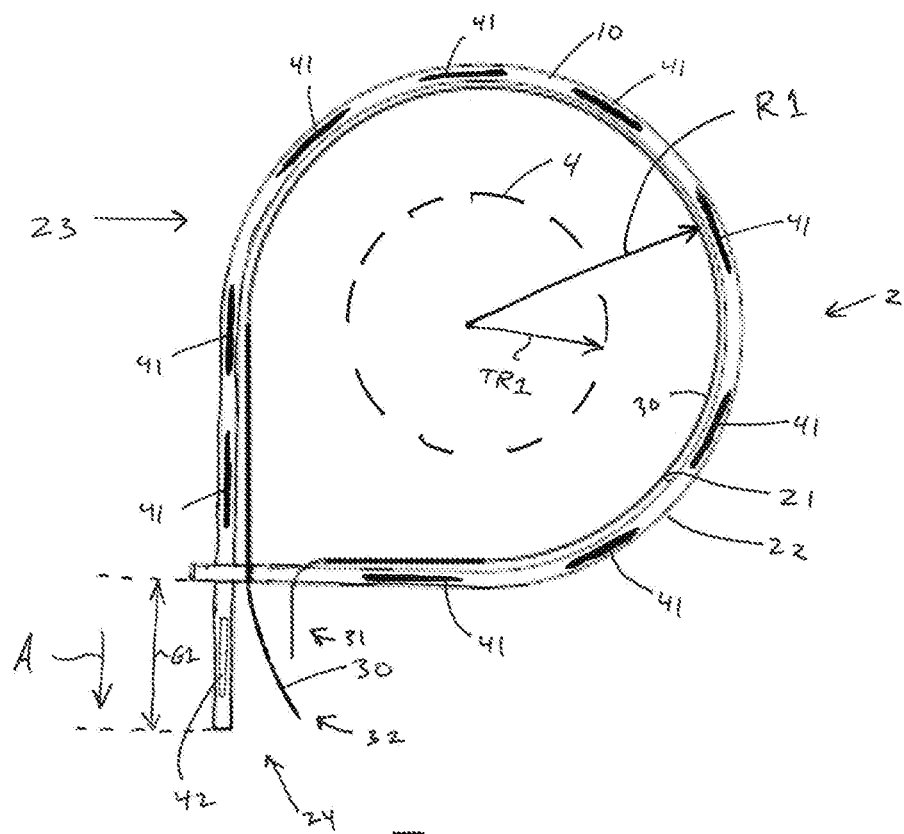
FIG. 9 is a cross sectional view of the tag assembly of FIG. 8 along 9-9 on FIG. 8.

FIGS. 8-9 depict the second end 12 of the band 10 received through the band opening 15 (see motion arrow A and FIG. 6) such that the tag assembly 2 and/or the band 10 encircles the tree 4. As such, the band 10 has a loop section 23 that encircles the tree 4 and an expansion or growth section 24 that extends from the loop section 23. The first end 31 of the shield strip 30 is also received through the strip opening 17 (FIG. 6). The loop section 23 has a first loop radius R1 and the growth section 24 has a first growth length G1.

Figure 10:
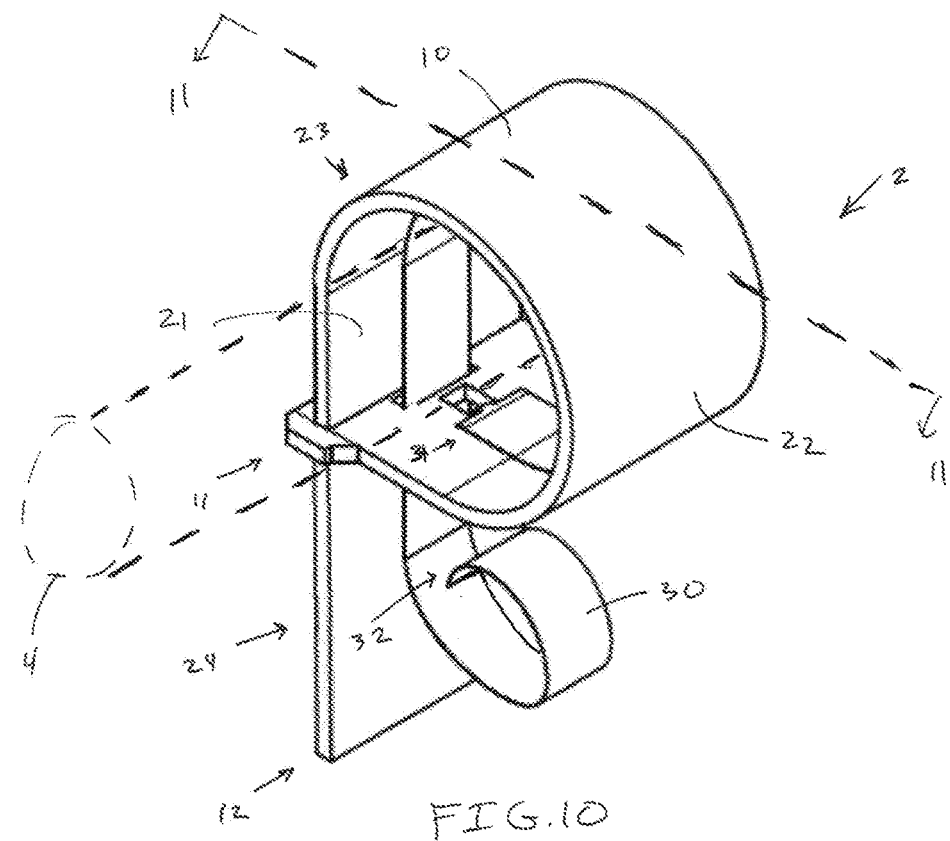
FIG. 10 is a perspective view of the tag assembly of FIG. 6 with the tag assembly tightening around the tree.
Figure 11:
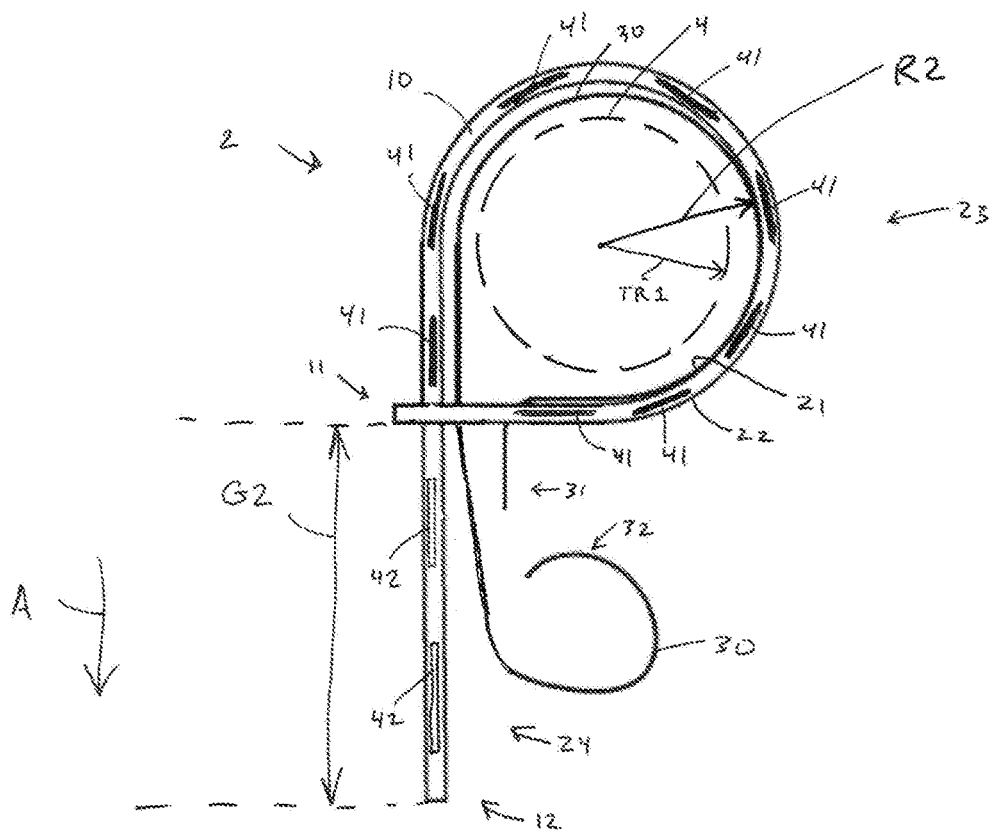
FIG. 11 is a cross sectional view of the tag assembly of FIG. 10 along 11-11 on FIG. 10.

FIGS. 10-11 depict the tag assembly 2 being tightened around the tree 4 by continuing to move, i.e. pull, the second end 12 of the band 10 through the band opening 15 and the second end 32 of the shield strip 30 through the strip opening 17 (see motion arrow A). Accordingly, the loop section 32 has a second loop radius R2 which is less than the first loop radius R1, and the growth section 24 has a second growth length G2 which is greater than the first growth length G1.

Figure 12:
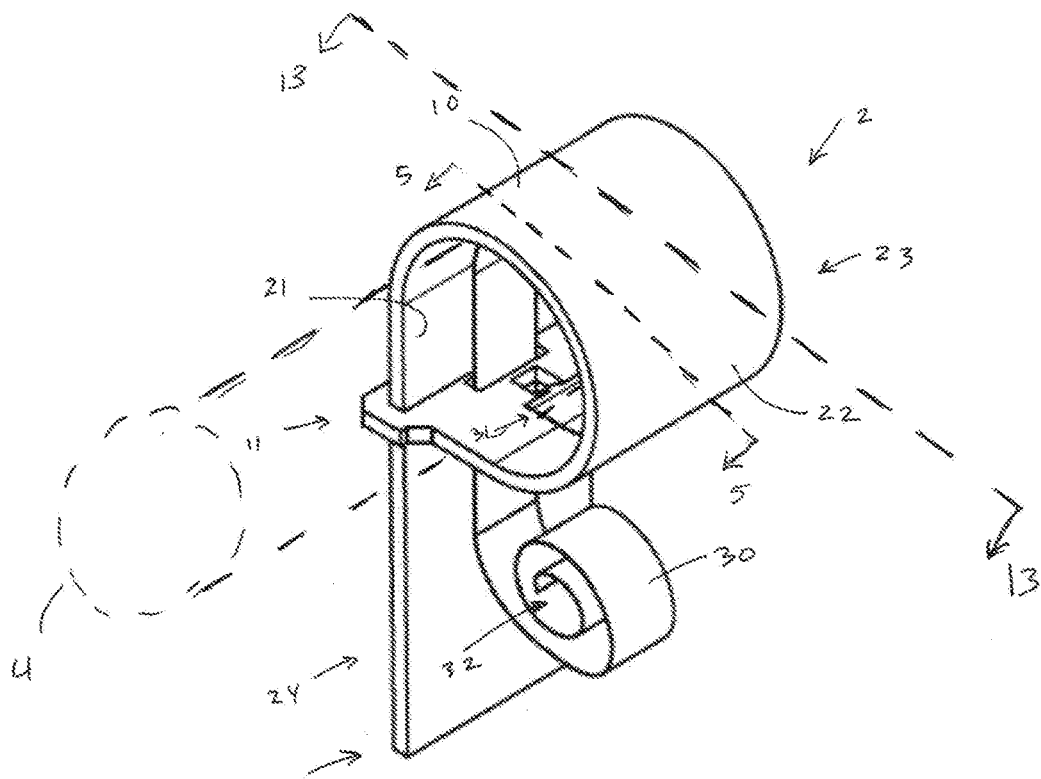
FIG. 12 is a perspective view of the tag assembly of FIG. 6 with the tag assembly contacting the tree.
Figure 13:
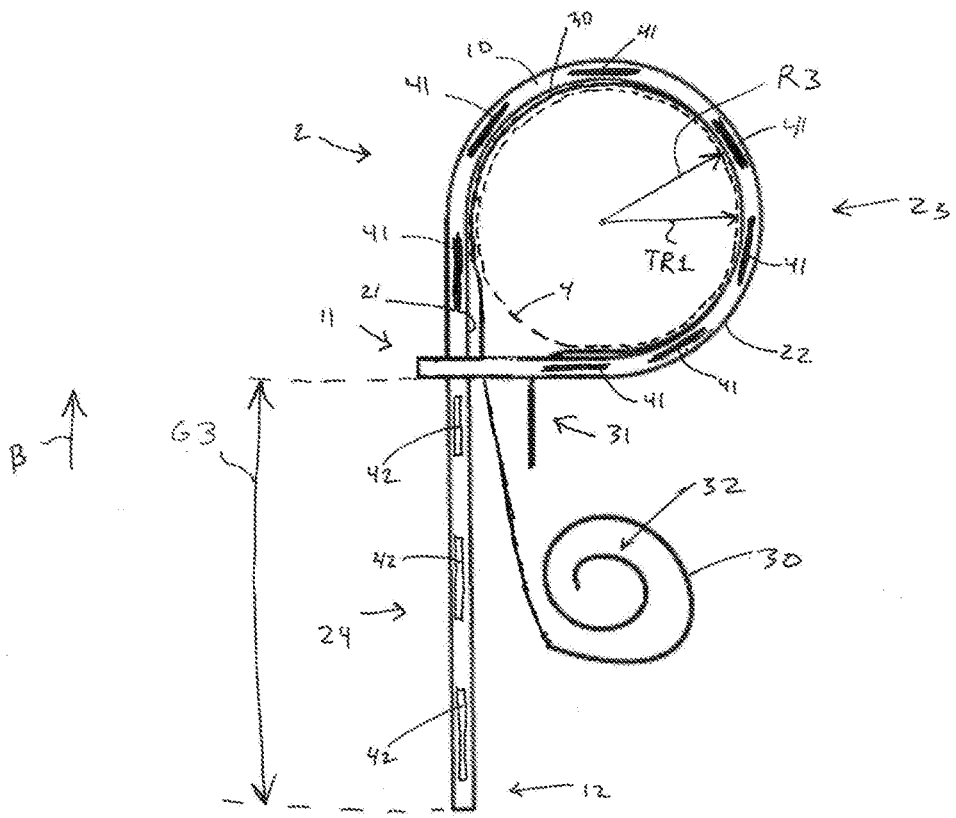
FIG. 13 is a cross sectional view of the tag assembly of FIG. 12 along 13-13 on FIG. 12.

FIGS. 12-13 depict the tag assembly 2 in contact with the tree 4 such that loop section 32 has a third loop radius R3 which is less that the second loop radius R2 and corresponds or is substantially similar to the first tree radius TR1. The growth section 24 has a third growth length G3 which is greater than the second growth length G2. The tag assembly 2 and/or the band 10 is held in contact with the tree 4 due to the interaction between the teeth 18 and band opening edge 14 (FIG. 2) thus preventing the second end 12 of the band 10 from moving in a second direction (see motion arrow B) opposite the first direction (see motion arrow A in FIG. 11) As such, the interaction of the teeth 18 (see FIG. 2)

with the band opening edge 14 prevents the tag assembly 2 from slipping or sliding along the tree 4.

Figure 14:
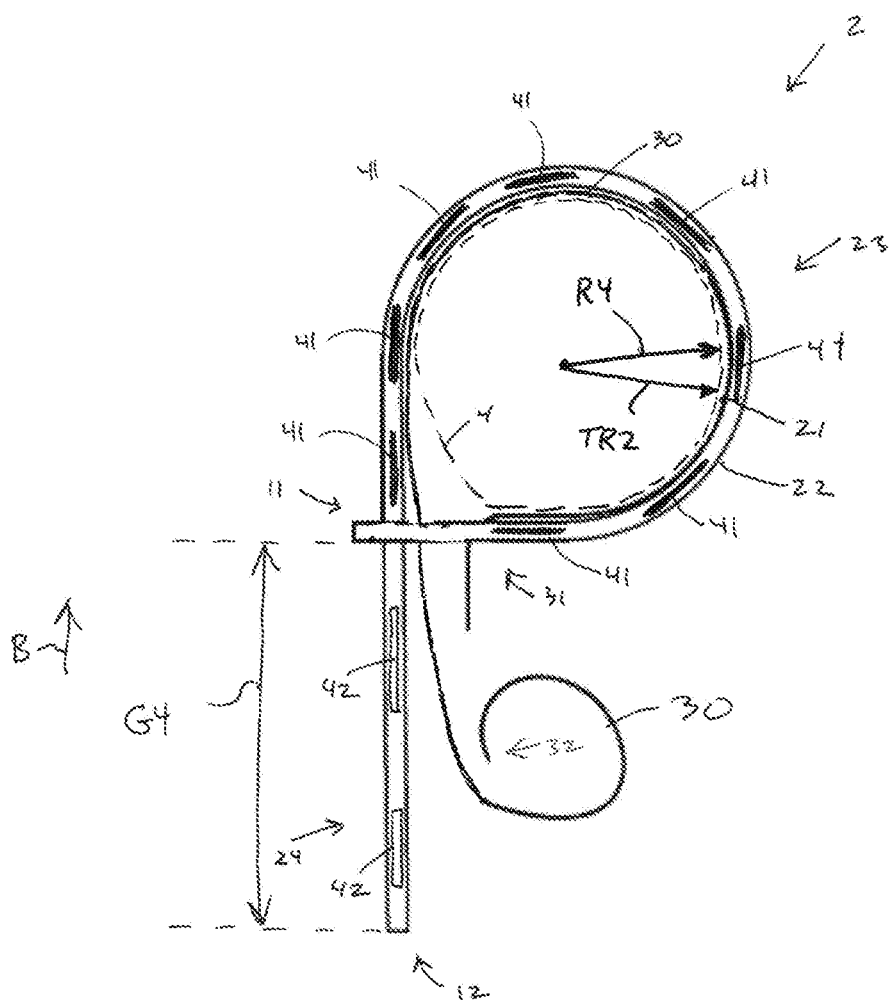
FIG. 14 is a cross sectional view of a tag assembly contacting a tree having a second tree radius.

FIG. 13 depicts seven shielded tags 41 along the loop section 23 and three unshielded tags 42 along the growth section 24. As will be described further herein, the unshielded tags 42 can be read or emit a signal such that a characteristic, i.e. circumference, of the tree 4 can be determined by a controller 100 (see FIG. 16). As the tree 4 grows, referring to FIG. 14, the tree radius increases to a second tree radius TR2 which is greater than the first tree radius TR1 (FIG. 7). Accordingly, the radius of the loop section 23 increases to a fourth loop radius R4 which is larger than the third loop radius R3 and the length of the growth section 24 also decreases to a fourth growth length G4 which is smaller than the third growth length G3 as a tooth or teeth 18 move through the band opening 15. Furthermore, the number of shielded tags 41 is increased to eight and the number of unshielded tags 42 is reduced to two. The loop section 23 and the growth section 24 continue to incrementally change as the tree 4 continues to grow. As such, the number of shielded tags 41 and the number of unshielded tags 42 changes over time as the tree 4 grows.

Figure 15:
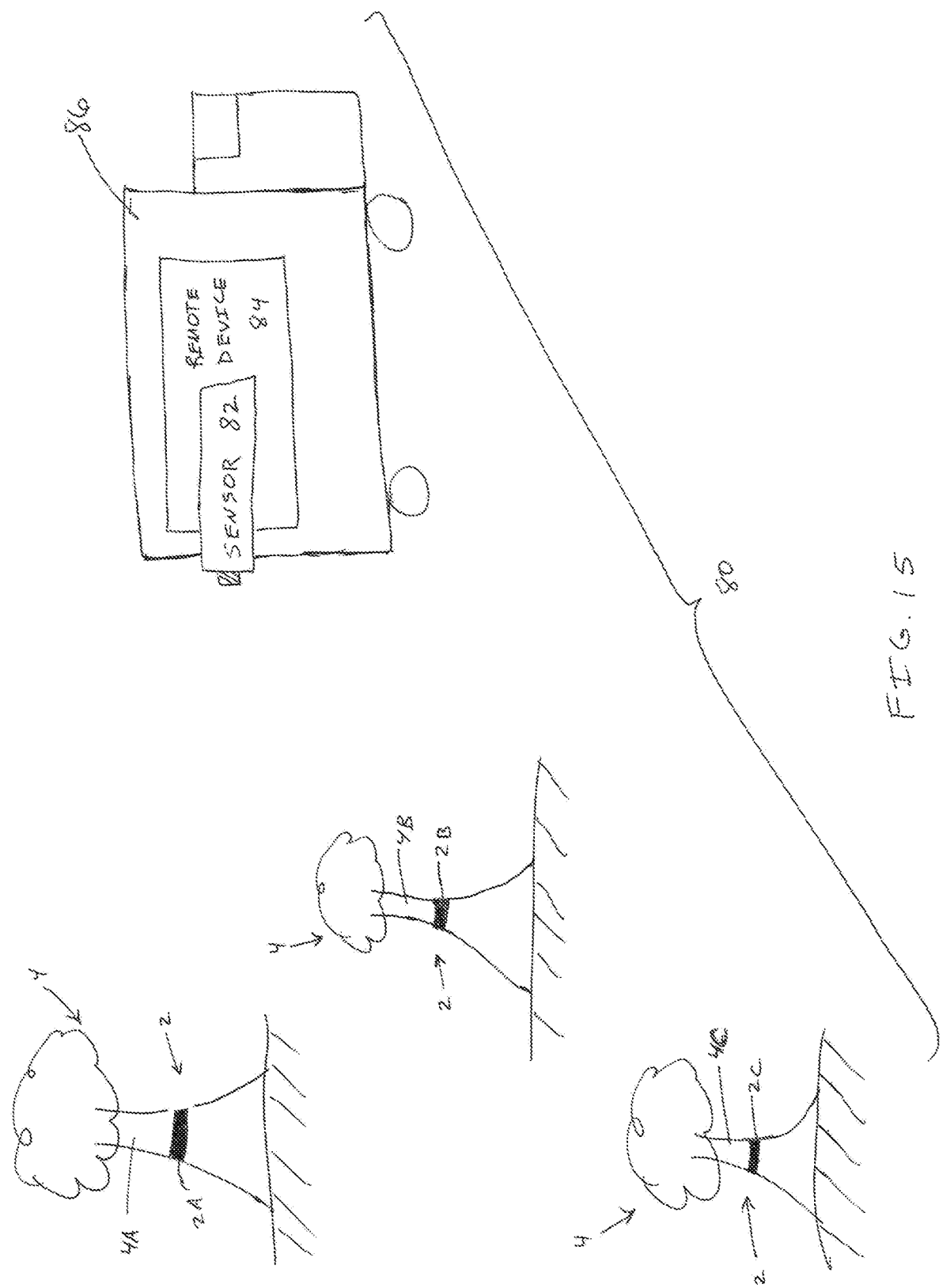
FIG. 15 is a schematic of an example system having a three tag apparatuses attached to three trees.
Figure 16:
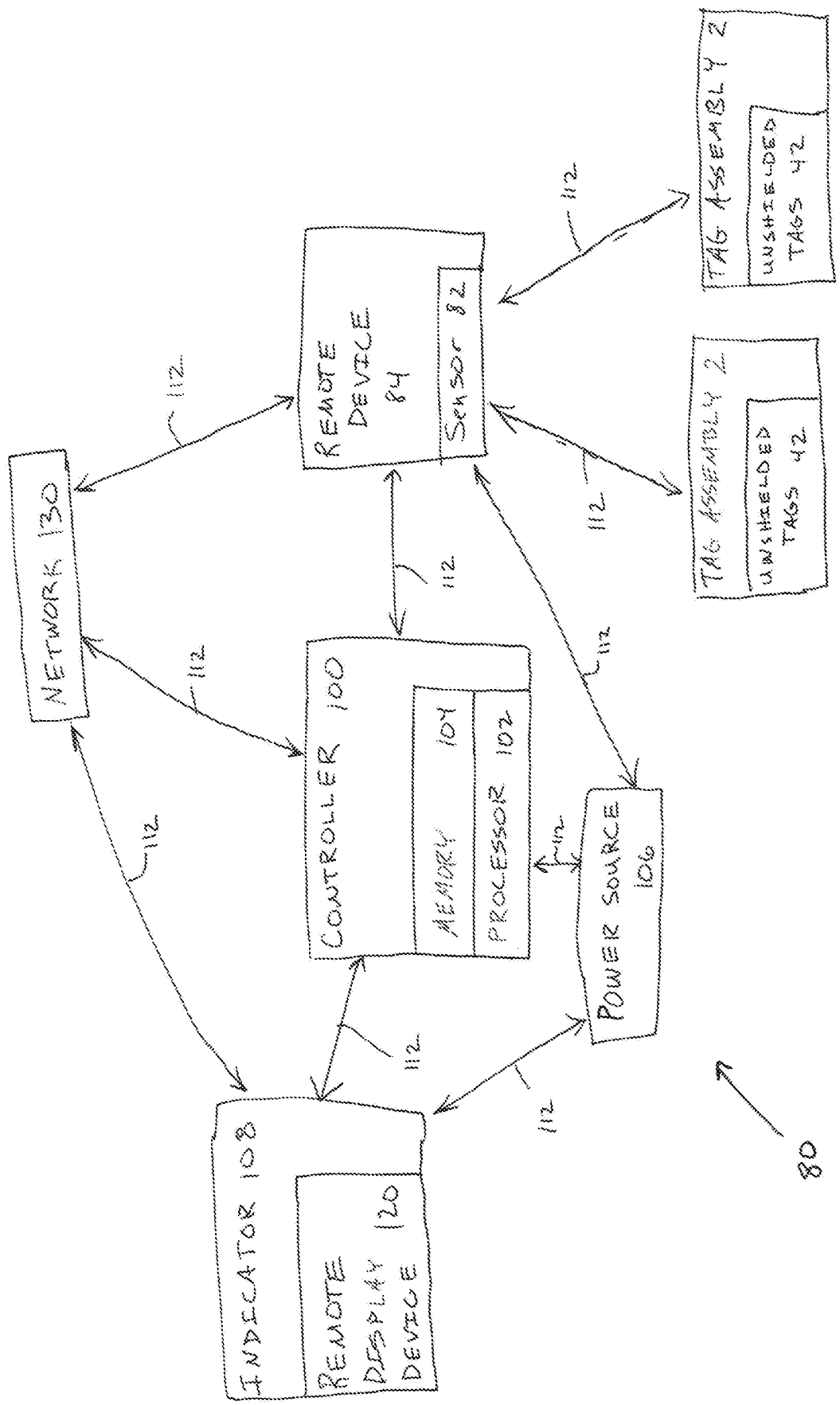
FIG. 16 is an example system diagram.

Referring to FIGS. 15-16, the tag assembly 2 can be used as part of a system 80 for determining a characteristic or measurement, i.e. the radius, diameter, or circumference, of the tree 4. The system 80 includes a sensor 82 that is configured to sense the unshielded tag(s) 42 (described above). The type of sensor 82 utilized in the system can vary based on the type of tag(s) 40 included with the tag assembly 2 and can include any suitable type of sensor. For example, a photoelectric sensor is used with the tag(s) 40 that are indicia labels, a reflected light sensor of a barcode scanner is used with tag(s) 40 that are barcodes, an electromagnetic sensors of a RFID reader is used with tag(s) 40 that are RFID tags, and/or an infrared sensor is used with tag(s) 40 that are infrared emitters. The sensor 82 can be part of a remote device 84, e.g. RFID reader, barcode scanner. In a specific non-limiting example, suitable commercially available RFID readers are available from Scanfob (model Ultra-BB2 UHF Reader/Writer), idChamp (model 1862 Bluetooth UHF Reader), and Impinj Speedway Revolution (model R420 UHF RFID Reader with Laird S9028CRF-IT1 antennas).

The system 80 includes a controller 100 that is in communication and/or coupled to the sensor 82. The controller 100 is configured to determine the characteristic, e.g. circumference, diameter, radius, of the tree 4, e.g. the tree trunk, tree the branch, about which the tag assembly 2 encircles based on the unshielded tag(s) 42 sensed by the sensor 82 and/or based on the shielded tag(s) 41 not sensed by the sensor 82. The controller 100 includes a processor 102 and a memory 104. The controller 100 can be located anywhere with respect to the sensor 82 and/or an indicator 108 (described further herein), including a remote display device 120. The controller 100 can be configured to communicate with the sensor 82 and/or indicator 108 via wired and/or wireless communication links 112. One having ordinary skill in the art will recognize that the controller 100 can have many different forms and is not limited to the example that is shown and described.

In some examples, the controller 100 includes a computing system that includes a processing system, storage system (i.e., memory 104), software, and input/output (I/O) interfaces for communicating with devices. The processing system loads and executes software from the memory 104, such as software programmed with indication control methods (as further described herein below). The computing system can include one or many application modules and/or one or more processors, which may be communicatively connected. The processing system can include a microprocessor (e.g., processor 102) and/or other circuitry that retrieves and executes software from the memory 104. Non-limiting examples of the processing system include general purpose central processing units, applications-specific processors, and logic devices.

The memory 104 can include any type of storage media that is readable by the processing system and capable of storing software. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

The controller 100 communicates with one or more components of the system 80 via the communication links 112, which can be wired or wireless links. The controller 100 is capable of monitoring and controlling one or more operational characteristics of the system 80 and its various subsystems by sending and receiving control signals via the communication links 112. It should be noted that the extent of connections of the communication links 112 shown herein is for schematic purposes only, and the communication links 112 could in fact provide communication between the controller 100 and each of the sensors 82, indicators 108, and various components described herein, although not every connection is shown in the drawing for purposes of clarity. The controller 100, the indicator 109, and/or the remote device 84 can be connected to a network 130, i.e. internet.

In certain examples, the controller 100 is programmed to determine a characteristic of the tree 4 by comparing the unshielded tag(s) 42 sensed by the sensor 82 to correlation data pertaining to the tag assembly 2, which is stored in the memory 104. That is, when an unshielded tag(s) 42 is sensed by the sensor 90 the controller 100 controls the indicator to indicate the characteristic of the tree 4 to the operator.

In certain examples, the memory 96 stores a look-up table. The look-up table can include a plurality of characteristics of the tree 4 that correlate to data or information pertaining to the tag assembly 2 and the tag(s) 40. For instance, for each tag assembly 2 the look-up table includes a list of the tag(s) 40 included with the tag assembly 2. Each tag 40 has a predetermined, i.e. pre-coded, unique tag identification label or number. Each tag identification number is associated with the tag(s) 40 and the tag assembly 2 to which the tag(s) 40 is attached. For instance, a first tag assembly 2, e.g. tag assembly number 001, has ten tags 40 each having a different identification number, e.g. a first tag has identification number 001.001, a second tag has identification number 001.002, a third tag has identification number 001.003, . . . , a ninth tag has identification number 001.009, a tenth tag has identification number 001.010. These tag identification numbers can be manually entered into the look-up table, programmed automatically during assembly and manufacture of the tag assembly 2, and/or logged automatically by the controller 100 when the tag assembly 2 is attached to the tree 4. In a specific example, the controller 100 can be configured to log tag identification numbers to the memory 104 when all the tags 40 are unshielded and thereby sensed by the sensor 82. This function can be performed prior to installation of the tag assembly 2 on the tree 4.

For example referring back to FIGS. 13-14, the ten tags 40 may be spaced apart along the band 10 between the first end 11 and the second end 12. These tags 40 can be spaced apart at a predetermined distance, e.g. equidistant, from each other such that the distance between the tags 40 is known. For example, the ten tags 40 may be spaced apart from each other by 0.25 inches (see table 1 below). Note that tag no. 001.001 is the tag 40 positioned nearest to the first end 11, tag no. 001.010 is the tag 40 positioned nearest the second end 12, and the remaining tags 40 are positioned incrementally and sequentially there between.

TABLE 1

| Tag No. | Distance from the first end |
|---|---|
| 001.001 | 0.25" |
| 001.002 | 0.50" |
| 001.003 | 0.75" |
| 001.004 | 1.00" |
| 001.005 | 1.25" |
| 001.006 | 1.50" |
| 001.007 | 1.75" |
| 001.008 | 2.00" |
| 001.009 | 2.25" |
| 001.010 | 2.50" |

Based on the unshielded tags 42 sensed by the sensor 82, the controller 100 can determine the characteristic, i.e. circumference, of the tree 4. For example, referring to FIG. 13 three unshielded tags 42, namely tag nos. 001.008, 001.009, 001.010, can be sensed by the sensor 82. Note that the remaining tags 40 are shielded by the shield strip 30, i.e. shielded tags 41, and are not sensed by the sensor 82. Accordingly, the controller 100 determines that tag no. 001.008 corresponds to the smallest cumulative length of the loop section 23 of the band 10. This length, 2.00 inches, corresponds to the circumference of the tree 4. Accordingly, the controller 100 indicates the circumference of the tree 4 at 2.00 inches on the indicator 108. The controller 100 can also be configured to control the indicator 108 to thereby indicate different characteristics of the tree 4 based on the tag(s) 40 sensed by the sensor 82. For example, the controller 100 can be configured to calculate or compute diameter and/or radius of the tree based on preprogrammed equations in the memory 104, e.g. diameter equals circumference divided by pi, radius equals circumference divided by (two multiplied by pi). These different values, e.g. radius, diameter, can be calculated by the controller 100 or precoded into the look up table. A person having ordinary skill in the art will recognize that that the controller 100 can be configured in any suitable manner to determine and thereby indicate various characteristics of the tree 4 based on the sensed unshielded tags 42 or the unsensed shielded tags 41.

Referring specifically to FIG. 15, the controller 100 (FIG. 16) can also be configured to determine characteristics of several different trees 4 as the sensor 82 senses unshielded tags 42 from different tag assemblies 2. In this example, a plurality of trees 4, i.e. a first tree 4A, a second tree 4B, and a third tree 4C, each have a tag assembly 2, i.e. a first tag assembly 2A, a second tag assembly 2B, and a third tag assembly 2C. The sensor 82 and is configured to remotely sense the unshielded tag 42 (see FIG. 13) on each of the tag assemblies 2A, 2B, 2C. In certain examples, the sensor 82 is mounted to a mobile vehicle 86, e.g. drone, all-terrain vehicle ATV, truck, plane. Accordingly, the controller 100 is configured to determine characteristics of each tree 4A, 4B, 4C and control the indicator 108 to indicate the characteristics of each tree 4A, 4B, 4C to the operator. For example, the memory 104 may include the following predetermined data regarding the tags 40 (see Table 2 below).

TABLE 2

| Tag Nos. for tag assembly 2A | Distance from the first end | Tag Nos. for tag assembly 2B | Distance from the first end | Tag Nos. for tag assembly 2C | Distance from the first end |
|---|---|---|---|---|---|
| 001.001 | 0.25" | 002.001 | 0.25" | 003.001 | 0.25" |
| 001.002 | 0.50" | 002.002 | 0.50" | 003.002 | 0.50" |
| 001.003 | 0.75" | 002.003 | 0.75" | 003.003 | 0.75" |
| 001.004 | 1.00" | 002.004 | 1.00" | 003.004 | 1.00" |
| 001.005 | 1.25" | 002.005 | 1.25" | 003.005 | 1.25" |
| 001.006 | 1.50" | 002.006 | 1.50" | 003.006 | 1.50" |
| 001.007 | 1.75" | 002.007 | 1.75" | 003.007 | 1.75" |
| 001.008 | 2.00" | 002.008 | 2.00" | 003.008 | 2.00" |
| 001.009 | 2.25" | 002.009 | 2.25" | 003.009 | 2.25" |
| 001.010 | 2.50" | 002.010 | 2.50" | 003.010 | 2.50" |

In one instance, the sensor 82 senses the following unshielded tags 42:

001.010, 001.009, 001.008, 001.007, 001.006, 001.005, 001.004, 001.003

002.010, 002.009

003.010, 003.009, 003.008, 003.007, 003.006

As is described above, the controller 100 is configured to determine the characteristics for each tree 4A, 4B, 4C by determining which of the sensed unshielded tags 42 corresponds to the smallest cumulative length of the loop section 23 of the bands 10. In this example, based on the sensed unshielded tags 42, the controller 100 determines and indicates via the indicator 108 that the first tree 4A has a circumference of 0.75 inches, the second tree 4B has a circumference of 2.25 inches, and the third tree 4C has a circumference of 1.50 inches.

A power source 106 can be coupled to the controller 100 to thereby supply power to the controller 100, the indicator 108, and/or the sensor 82. The power source 106 can be any suitable power source including batteries, replaceable batteries, solar panel, kinetic energy harvester, and/or the like. Alternatively, the system 80 can be connected to an external power source, such a vehicle power system.

In certain examples, the sensor 82 is connected to mobile vehicle 86 and configured to scan an entire forest and determine whether multiple trees 4 within the forest are ready for harvesting. In this way, a determination on when to harvest the trees 4 in the forest can be made when a certain number of trees 4 in the forest reach an optimal size, as determined by the controller 100 when certain RFID tags 40 are shielded or unshielded as the trees 4 grow. Various types of different data and information, e.g. tree ID, planting date, plate species, may be integrated in the system 80. For example, the location of each tag assembly 2 and/or tag 40, i.e. a global positioning system (GPS), can be logged by the controller 100 when the tag assembly 2 is attached to the tree 4. The GPS data can be sensed by the remote device 84 and thereby communicated to the controller 100. Accordingly, 3D topographic mapping, tracking annual weather patterns vs tree growths for harvest, spectral imaging, and/or satellite imaging which can be integrated and statistically integrated into the system 80.

The shielding effectiveness of the shield strip 30 depends on the frequency of RFID tags being used. Low-frequency RFID tags (LowFID), like those used in implantable devices for humans and pets, are relatively resistant to shielding though thick metal foil will prevent most reads. High frequency RFID tags (HighFID) (13.56 MHz—smart cards and access badges) are sensitive to shielding and are difficult to read when within a few centimeters of a metal surface. UHF RFID tags (Ultra-HighFID) (pallets and cartons) are difficult to read when placed within a few millimeters of a metal surface, although their read range is actually increased when they are spaced 2-4 cm from a metal surface due to positive reinforcement of the reflected wave and the incident wave at the tag. In certain examples, the tag assembly 2 includes an elastomeric overwrap (not shown) that is RF transparent and allows RFID reception and transmission, but blocks UV solar spectrum, water, and humidity. Passive RFID tags can operate at different frequencies. There are three main frequencies within which passive RFID tags operate. The frequency range, along with other factors, strongly determines the read range, attachment materials, and application options. Low Frequency (LF) (125-134 KHz) is an extremely long wavelength with usually a short read range of about 1-10 centimeters. This frequency is typically used with animal tracking because it is not affected much by water or metal. High Frequency (HF) & Near-Field Communication (NFC) (13.56 MHz) is a medium wavelength with a typical read range of about 1 centimeter up to 1 meter. This frequency is used with data transmissions, access control applications, DVD kiosks, and passport security—applications that do not require a long read range. Ultra High Frequency (UHF) (865-960 MHz) is a short, high-energy wavelength of about a one meter which translates to long read range. Passive UHF tags can be read from an average distance of about 5-6 meters, but larger UHF tags can achieve up to 30+ meters of read range in ideal conditions. This frequency is typically used with race timing, IT asset tracking, file tracking, and laundry management as all these applications typically need more than a meter of read range. Often, higher frequencies will have shorter, higher-energy wavelengths and, in turn, longer read ranges. Moreover, the higher the frequency, generally speaking, the more issues an RFID system will have around non-RFID-friendly materials like water and metal (e.g. RFID Proximity systems: 125 kHz, 13.56 MHz; and RFID Long-range systems: 433 MHz, 860-930 MHz (UHF), 2.4-2.5 GHz, 5.8 GHz). Active RFID tags typically operable on two main frequencies: 433 MHz and 915 MHz.

The present inventors have also recognized that the tag assembly 2 and/or the system 80 can be configured in such a way that the controller 100 controls the indicator 108 to indicate that a tree 4 is ready for harvest, i.e. meets a predetermined condition such as a minimum diameter or caliper (a "go/no go" system). In this example, the controller 100 controls the indicator 108 to indicate that a tree 4 is ready for harvest when the tag 40 is unshielded or shielded. The example tag assembly 2 can simply include a single tag 40 that is either shielded or unshielded when the tag assembly 2 is attached to the tree 4. As the tree 4 grows, the tag 40 is either shielded or unshielded, based on the starting condition of the tag 40, and the sensor 82 senses or no longer senses the tag 40. Accordingly, the controller 100 controls the indicator 108 to indicate that the tree 4 has met the predetermined condition and is ready for harvest. In another example, the band opening 15 and/or the band opening edge 14 can be configured to activate or deactivate tag(s) 40 passing through the band opening 15 as the tree 4 grows such that certain tag(s) 40 can be read or emit a signal after passing through the band opening 15.

The present disclosure includes a method of determining a characteristic of the tree 4. The method can include encircling the tree 4 with the band 10 that has a plurality of tags 40 spaced apart along the band 10, the band 10 configured to adapt to the tree 4 and expand as the tree 4 grows; positioning a shield strip 30 partially along the band 10 to thereby shield a number of tags 40 in the plurality of tags 40 from being read or emitting a signal, the plurality of tags 40 include at least one shielded tag 41 and at least one unshielded tag 42 and wherein the number of shielded tags 41 and unshielded tags 42 changes as tree grows; sensing or reading, with a sensor 82, the unshielded tags 42; determining, with a controller 100, the characteristic of the tree 4 based on the unshielded tags 42 sensed by the sensor 82; and/or controlling, with the controller 100, an indicator 108 to thereby indicate the characteristic of the tree 4.

What is claimed is:

1. A tag assembly for a tree having a diameter, the tag assembly comprising:
    a housing; and
    a band having a loop section that extends out of the housing and is configured to encircle the tree, a growth section in the housing, a plurality of tags spaced apart thereon, and a first end on the loop section that couples to the housing such that the housing and the band are on the tree and the loop section encircles the tree;
    wherein the loop section has a loop radius and the growth section has a growth length, and wherein the loop radius and the growth length are configured to change as the diameter of the tree increases;
    wherein the housing shields tags along the growth section from being sensed or read;
    wherein the tags along the loop section are capable of being sensed or read such that the diameter of the tree can be determined; and
    wherein as the diameter of the tree increases the band is automatically moved out of the housing such that the loop radius increases, the growth length decreases, and additional tags are moved out of the housing such that the additional tags are capable of being sensed or read.

2. The tag assembly according to claim 1, wherein the loop section has a loop length, and wherein as the tree diameter increases the loop length increases as the band is moved out of the housing.

3. The tag assembly according to claim 2, wherein each tag in the plurality of tags is a radio frequency identification tag.

* * * * *